Sept. 13, 1966 R. HAISCH 3,271,910
METHOD OF AND APPARATUS FOR CORRECTING THE SIZE AND ANGULAR
RELATION BETWEEN A WORKPIECE TO BE GROUND AND A TOOL
Filed June 10, 1964 4 Sheets-Sheet 1

INVENTOR
RUDOLF HAISCH

BY

ATTORNEY.

Sept. 13, 1966  R. HAISCH  3,271,910
METHOD OF AND APPARATUS FOR CORRECTING THE SIZE AND ANGULAR
RELATION BETWEEN A WORKPIECE TO BE GROUND AND A TOOL
Filed June 10, 1964  4 Sheets-Sheet 2

INVENTOR
RUDOLF HAISCH
BY
ATTORNEY.

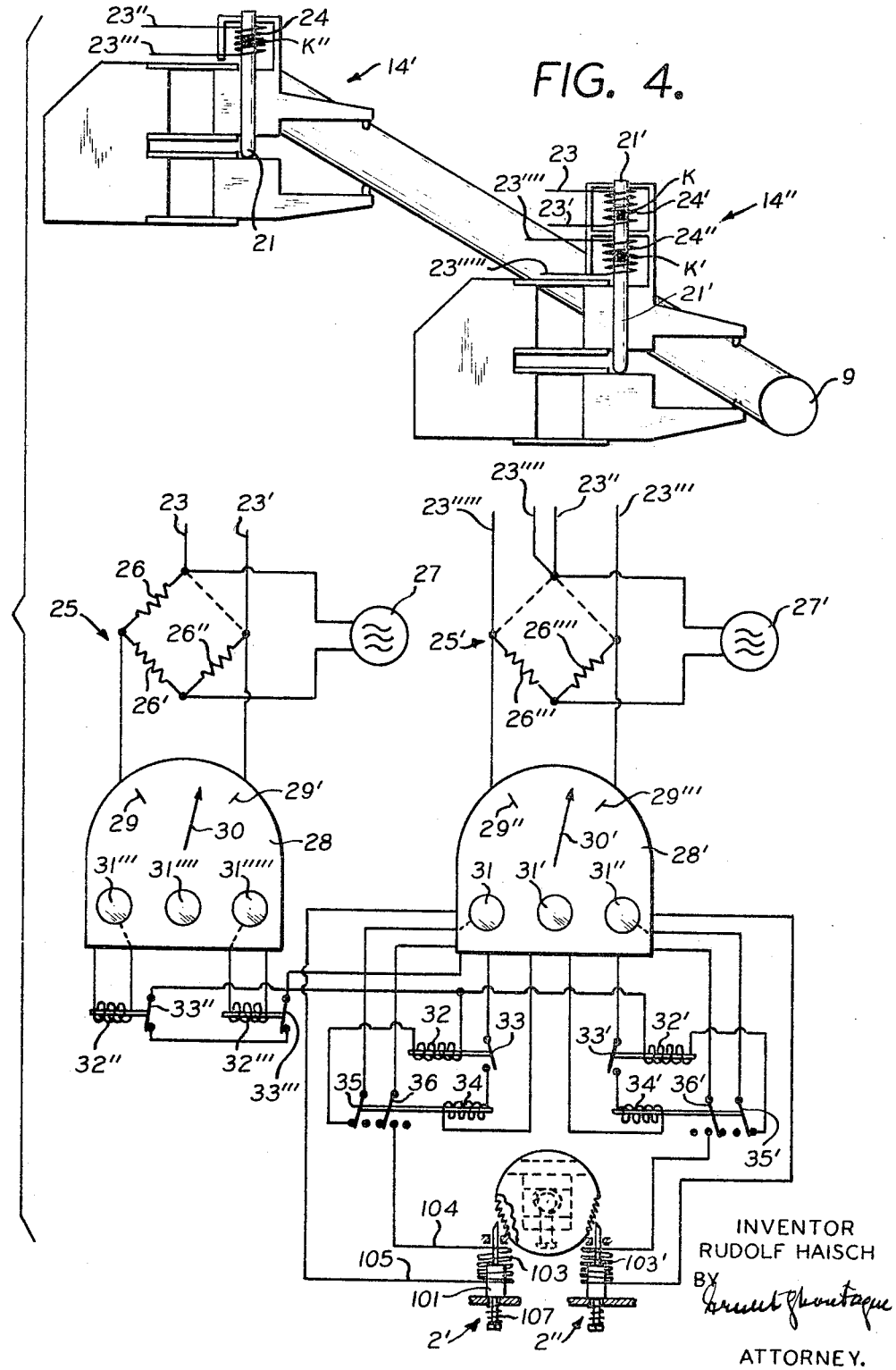

INVENTOR
RUDOLF HAISCH
ATTORNEY.

United States Patent Office 3,271,910
Patented Sept. 13, 1966

3,271,910
METHOD OF AND APPARATUS FOR CORRECTING THE SIZE AND ANGULAR RELATION BETWEEN A WORKPIECE TO BE GROUND AND A TOOL
Rudolf Haisch, Dahlienweg 19, Ruit, Kreis,
Esslingen (Neckar), Germany
Filed June 10, 1964, Ser. No. 374,126
Claims priority, application Germany, Apr. 12, 1961,
H 42,273
7 Claims. (Cl. 51—165)

This application is a continuation-in-part of application Serial No. 186,561, filed April 10, 1962, now abandoned.

The present invention relates to a method of and an apparatus for enforcing a parallel or a predetermined angular position between the axes of a grinding wheel spindle and of a work piece to be ground.

During the grinding of shafts it is quite often of particular importance that the diameter is constant along the entire axial length thereof, in order to obtain and maintain a truly cylindrical work piece. In order to avoid any conical formation, most of the grinding machines have devices, which permit an adjustment of the parallel arrangement between the axis of the work piece and the axis of the grinding wheel spindle. These devices are furthermore also suitable for setting and maintaining a selectively chosen angle between the axis of the grinding wheel spindle and the axis of the work piece, whereby either cylindrical work pieces are ground as a result of an oblique truing of the grinding wheel or wheels, or conical or tapered work pieces are ground.

It is also often possible that either by step-like truing of one or a plurality of wheels or also by using a plurality of wheels, as a rule, which are all mounted on one or on different grinding wheel spindles, a plurality of work pieces having cylindrical or conical formation of the same or different diameters, are ground.

These known devices permit, starting with different diameters measured on the work piece, adjustment and correction, respectively, of the parallel arrangement or the desired angular position. This is brought about by applying a control force to one of the work piece supports so as to distort the same and thereby set the orientation of the axis of the work piece relatively to that of the grinding wheel. Thus, such known methods of enforcing the parallel position or of a predetermined angular or tapered position between the axes of the grinding wheel spindle and the work piece are, however, of static nature, that means, the diameters are not measured and corrected during the grinding process, rather during grinding rest periods.

Furthermore, methods are known, in which the different diameters of the work piece are measured continuously. If now one of these diameters reaches its calculated value, then the grinding process is interrupted and the worker corrects by operation of stays and/or by adjustment of the grinding table, the parallel or angular position. This correction is, however, often merely a bending of the axis of the work piece in order to bring about a desired diameter.

All known devices which work with electrical, electronic, pneumatic or other measuring- or control-value indicators, for instance, also with spring switch control-value indicators, control merely and solely the different feeding speeds and stop the feed upon reaching the calculated value or even sooner, whereby as a rule a speed return run follows.

It is thus known to men skilled in the art that when grinding work by the plunge-cut method with wide or with multiple grinding wheels, deviations from the straightness are incurred as operations go on. Such deviations are due to bearings at different locations heating up differently, especially with regard to workhead and wheelhead bearings. Other reasons for such deviations are to be found in differences in stock removing capacity of various single units comprising multiple grinding wheels, in differing grinding allowances, in ambient temperature changes, etc.

It is, therefore, one object of the present invention to provide a method of enforcing a parallel or a predetermined angular position between the axes of a grinding wheel spindle and of a work piece to be ground, which operates automatically and continuously.

It is another object of the present invention to provide a method of enforcing a parallel or a predetermined angular position between the axes of a grinding wheel spindle and of a work piece, wherein, dependent upon the difference measurement between at least two measuring points on the work piece, the parallel position or the predetermined angular position of the axes of the grinding wheel and of the work piece is enforced exactly or at least within the permissible tolerances.

It is yet another object of the present invention to provide a method of and apparatus for enforcing a parallel or a predetermined angular position between the axes of a grinding wheel spindle and of a work piece to be ground, wherein switching impulses originating from the difference measurement are transmitted as control impulses to a mechanical, hydraulical, penumatic, electrical or other force producer, which automatically exerts a force corresponding with the mentioned impulses for the production of a relative change of the spacial position on at least one bearing of the work piece or of the tool. The method, designed in accordance with the present invention, is thus based on a difference measuring between at least two measuring points on the work piece, which, however, do not have to reach always the same calculated value. The deviation from the calculated value and the difference of the measured deviation is always measured. Measuring devices for such a difference measuring are known.

The apparatus designed to perform the present method comprises two measuring heads which check the size of the work piece continuously. The two measuring heads are so placed that they measure the diameters at the extreme ends of the work piece. As soon as differences are noted between the measured diameters and the master, a servo-motor is started to displace the tailstock quill in parallelism to its axis, the tailstock being mounted on a very wide spring-loaded plate, until the deviations in straightness, which have been incurred, are compensated, i.e. until there are no longer differences between the diameters measured and the master.

It is of particular importance in accordance with the present method, that the required control impulses are transmitted not before, during or shortly before the start of the grinding, rather only shortly before reaching of the diameter or diameters of the calculated value or values. Accordingly, the control impulses are to be transmitted, for instance, only then, when one or a plurality of the measured diameters are finely ground or scored. The fine grinding or scoring is to be understood as the state of the machine just prior to reaching the final measurements, which state is defined by a small and/or reducing grinding pressure or grinding force, and by a small and reduced detachment of cuttings per time unit, in contradiction to other known states of the machine, as, for instance, speed feed, rough feed, stopping or speed return stroke. The adjustment force of the force producer which is released by the control impulses and predetermined as to its value, and the adjustment stroke delivered in a similar manner from a feeding mechanism, respectively, is transmitted either to the head stock or to the tail stock or to the grinding table or to at least one bearing of the tool and to a plurality of these construction elements simultaneously, respectively, with the aim to effect a position change of a construction element supporting the work piece or the tool, preferably by elastic deformation of this or these construction elements or by a displacement thereof.

Any apparatus is suitable as force producer, which is capable of exerting a corresponding force upon a predetermined part of the machine, in response to, preferably, electrical control impulses. The apparatus can operate mechanically, hydraulically, pneumatically, electrically, magnetically or by other means. The force provided by the apparatus can operate as a pulling or pushing force to effect the desired position change of one or a plurality of elements of the machine and of the work piece, respectively.

With these and other objects in view, which will become apparent in the following detailed description, the present invention will be clearly understood in connection with the accompanying drawings, in which.

Figure 1:
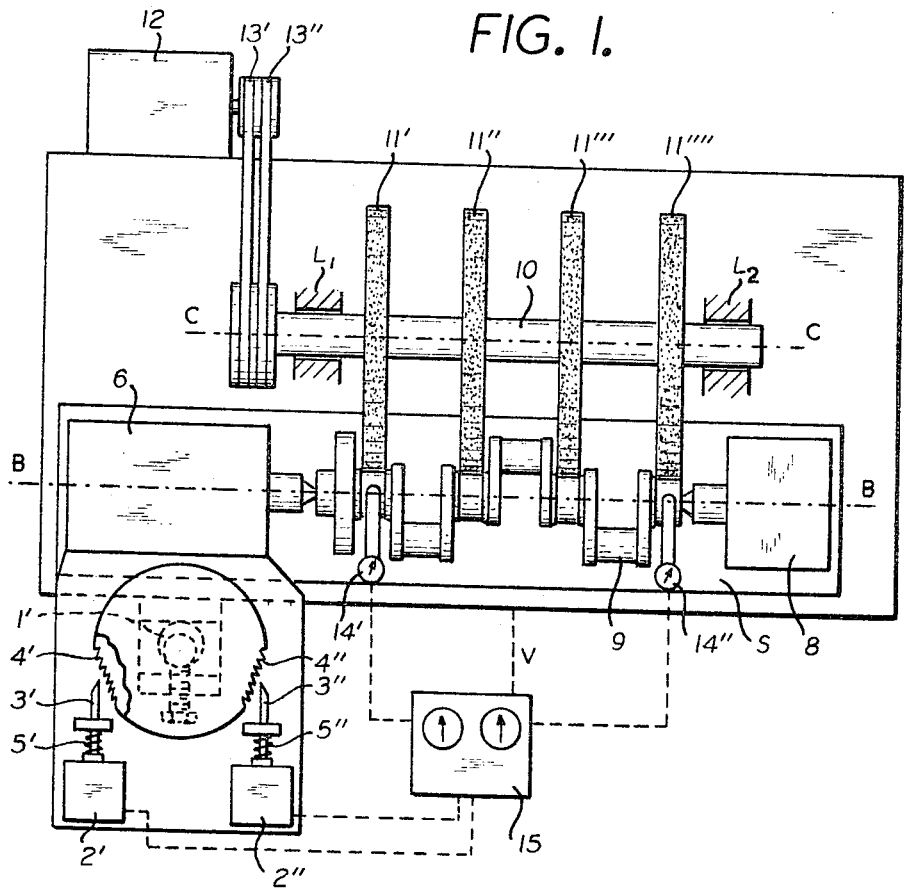
FIGURE 1 is a schematic top plan view of the apparatus indicating the relative position between the grinding wheels and a work piece.
Figure 3:
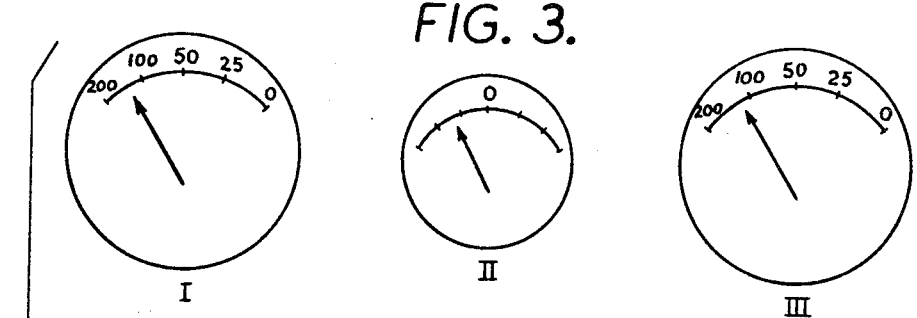
Figure 5:
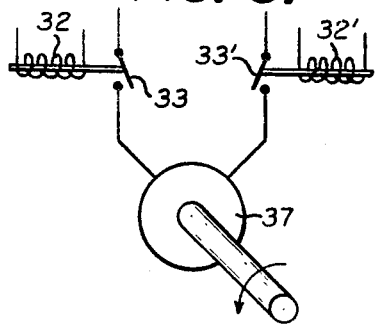
Figure 6:
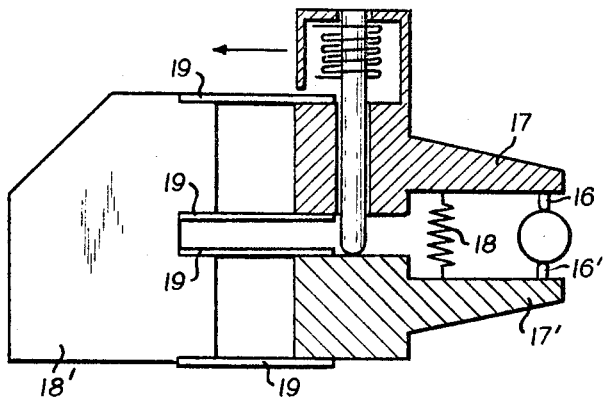
Figure 7:
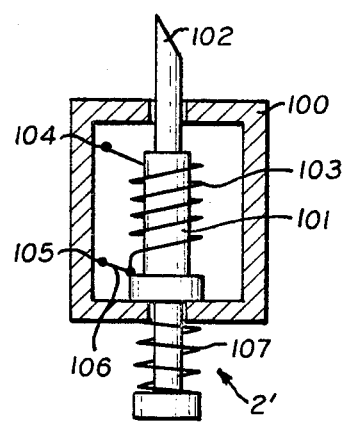
Figure 9:
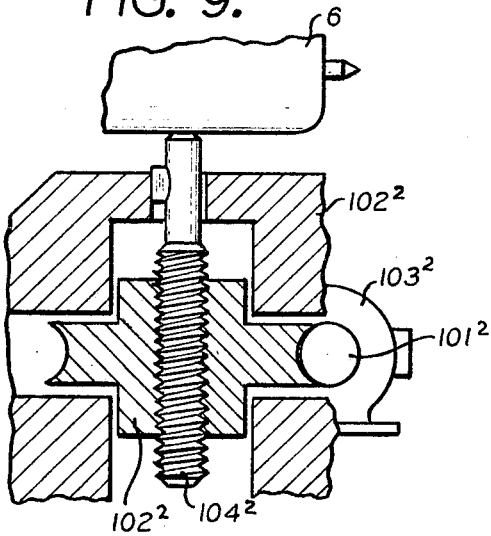
Figure 8:
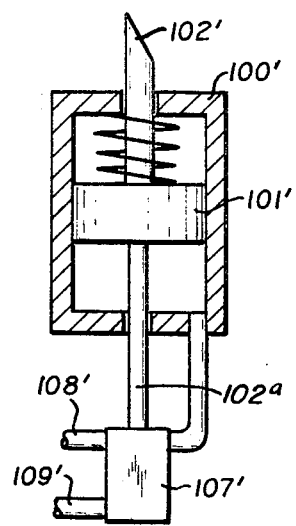
Figure 10:
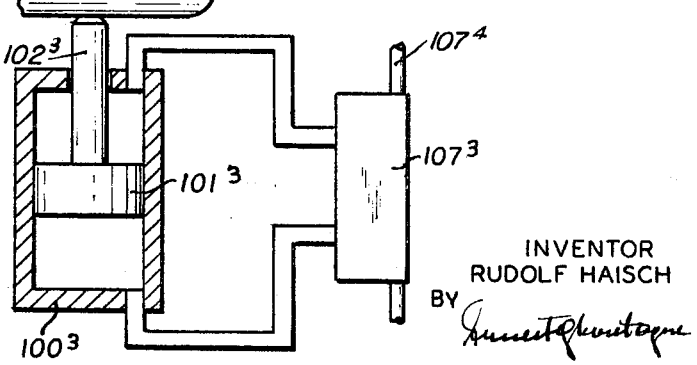

FIG. 3 indicates schematically the operating board of a measuring and control device designed for the performance of the method of operating the apparatus disclosed in FIG. 1;

FIG. 4 is a schematic diagram of the measuring control device;

FIG. 5 is a fragmentary schematic view of a variation of the diagram of FIG. 4;

FIG. 6 is a schematic section of a measuring value device;

FIG. 7 is a schematic view of a magnetically operated device;

FIG. 8 is a schematic view of a pneumatically operated device;

FIG. 9 is a schematic view of an electrically operated device;

FIG. 10 is a schematic view of a hydraulically operated device; and

Figure 11:
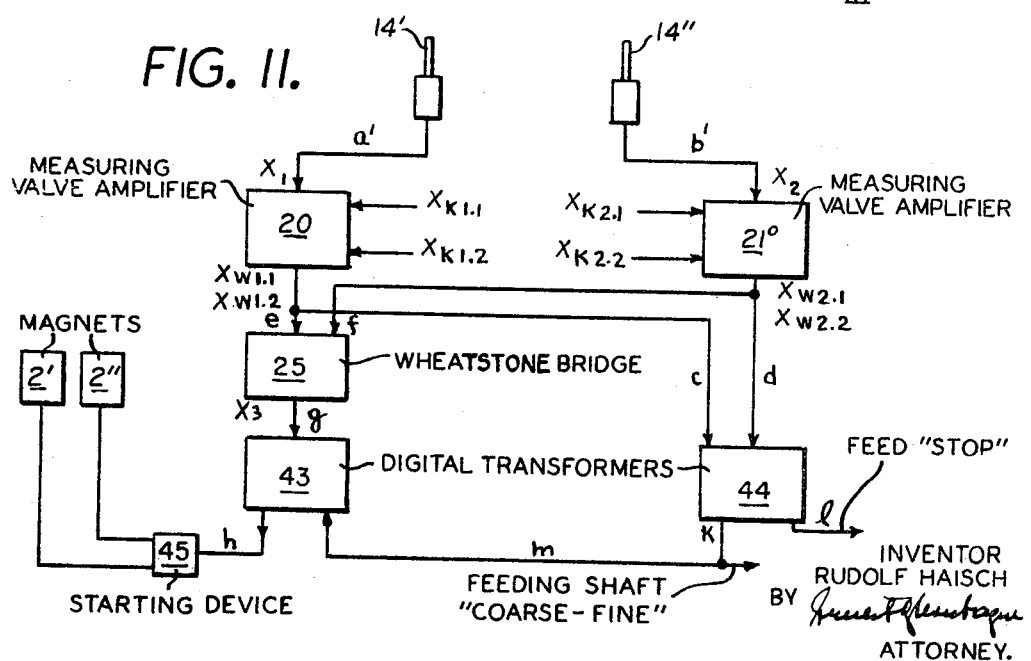

FIG. 11 is a schematic circuit diagram for the measuring control device.

Figure 2:
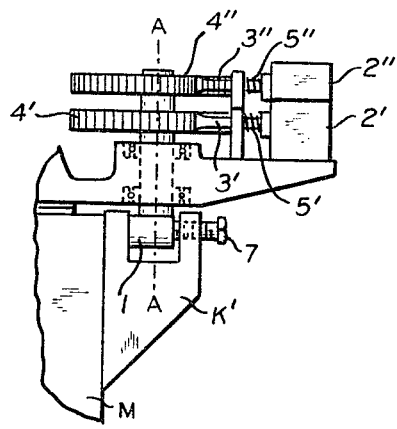
FIG. 2 is a fragmentary end view of the apparatus shown in FIG. 1.

Referring now to the drawings, and in particular to FIGS. 1 and 2, a crank shaft 9, constituting by example the work piece, is clamped between the head stock 6 and the tail stock 8 for rotation between the points about the axis B—B. A grinding wheel spindle 10, the axis of which is indicated along the axis C—C, carries grinding wheels 11′, 11″, 11‴ and 11⁗. The grinding wheel spindle 10 is driven by a motor 12 by means of wedge shaped belts 13′ and 13″. At least two control or measuring value indicators 14′ and 14″ measure, as shown in FIG. 1, during the grinding operation two portions of the work piece 9 of equal or different diameters, which indicators are spaced apart from each other as much as possible in the direction of the axis B—B.

At least at one of the measured diameters, the deviation of its calculated value, that means of the finished measure, if the tolerances are disregarded, and always upon reaching predetermined and set or settable amounts of this deviation, respectively, the feed of the machine and the total working cycle of the machine, respectively, is controlled in known manner by means of the measuring control device, whereby the operative connection V transmits, in known manner, control impulses to the machine. As a matter of deviation therefrom, it is possible, that the measuring control device 15 does not control the usual and known working cycle, rather that this working cycle is obtained either by an additional measuring control device (not shown), whereby the operative connection V may be eliminated, or it is also possible for such instances, that, for instance, the normal working cycle of the machine is enforced with pure mechanical and electro-hydraulical means without a conventional measuring control device.

The particular requirement which is made upon the measuring control device 15, resides in an arrangement according to which it can form the differences of the deviations, measured at different diameters, from the calculated values of these diameters, whereby the different diameters may have different calculated values. Such measuring control devices are known. In addition, certain and possibly adjustable values of this difference must release switching impulses, as is likewise known.

The essential feature of the method according to the present invention resides in the fact that these switching impulses are used for the purpose of enforcing the parallel position or a predetermined angular position of the axis C—C of the grinding wheel spindle and of the axis B—B of the work piece exactly or at least approximately within the permissible tolerances.

It is important thereby, that the control of the machine by these switching impulses does not take place during the rough grinding and, as a rule, also not during the first part of the fine grinding, rather only shortly before reaching the calculated values during the grinding process, thus, as a rule, at the end of the fine grinding or during the finest grinding or scoring. As a rule, the switching impulses control the machine automatically.

The spacial position of the axis C—C of the grinding wheel spindle 10 is determined by the bearings L1 and L2, while the spacial position of the axis B—B of the work piece is determined by the head stock 6 and the tail stock 8.

In accordance with the present invention, forces corresponding with the switching impulses and controlled by the mentioned switching impulses and those originating from the difference measuring, are effective upon at least one of the following elements of the structure, namely the bearing L1, the bearing L2, one or more additional bearings (not shown in FIG. 1), the head stock 6, the tail stock 8, the grinding table $s$ or the work piece 9 and finally also stays (not shown).

The measuring control device 15 disclosed schematically in FIG. 1 is shown in greater detail in FIG. 4 of the drawings.

The measuring value indicator 14″ includes the inductive coils 24′ and 24″ into which the spring-biased sensing pin 21′ including the cores K and K′ extends. The inductive coil 24′ is connected with a Wheatstone-bridge 25 by means of the conduits 23 and 23′, which Wheatstone-bridge 25 includes the immovable inductive resistances 26, 26′ and 26″. The Wheatstone-bridge 25 is fed from a generator 27 with alternating current. An indicator instrument 28 is connected with the Wheatstone-bridge 25. The inductive coil 24″ of the measuring value indicator 14″ is connected with a Wheatstone-bridge 25′ by means of the conduits 23⁗ and 23⁗′. The Wheatstone-bridge 25′ includes the immovable inductive resistances 26‴ and 26⁗. It is fed with alternating current from a generator 27′. An indicating instrument 28′ is connected with the Wheatstone-bridge 25′.

This measuring value indicator 14′ includes an inductive coil 24 into which a spring-biased sensing pin 21 having the core K″ projects. The inductive coil 24 is connected with the Wheatstone-bridge 25′ by means of the conduits 23″ and 23‴.

The function of the mentioned coils can be explained at its best in connection with the grinding operation.

During the grinding of the work piece disclosed in FIG. 1, the diameters, ground by the machine and measured by the measuring value indicators 14′ and 14″, are continuously diminishing. Consequently the spring-biased sensing pins 21 and 21′ with their cores K, K′ and K″ move corresponding with and in the direction of diameter reduction in the coils 24, 24' and 24". The inductivities of the coils 24, 24' and 24" are changed thereby. With the change of the inductivity of the coil 24' the electrical balance of the Wheatstone-bridge 25 is likewise changed. If the pointer 30 of the indicator instrument 28 points at first towards the left, it moves with diminishing diameter of the work piece 9, which is measured by the measuring value indicator 14", towards the right (FIG. 4), and passes thereby the marks 29 and 29'.

The difference measuring is indicated on the indicator instrument 28'. The difference measuring is brought about by the change of the inductivities of the coils 24 and 24". If the diameters of the work piece 9, which are measured by the measuring value indicators 14' and 14", diminish equally, the inductivities of the coils 24 and 24' diminish also equally. The electrical balance of the Wheatstone-bridge 25' is not disturbed thereby, and the pointer 30' remains in the center position, provided that both said diameters of the work piece 9 were equal. If the diameter of the work piece 9, which is measured by the measuring value indicator 14', changes relative to the diameter, which is measured by the measuring value indicator 14", the inductivities of the coils 24 and 24" change likewise and, thereby, the electrical balance of the Wheatstone-bridge 25' is disturbed. If, for instance, the diameter of the work piece 9, measured by the measuring value indicator 14", becomes smaller, relative to the other diameter thereof, measured by the measuring value indicator 14', the pointer 30' of the indicator instrument 28' points to the right. If the pointer 30' passes over the mark 29", a lamp 31 lights up, by providing conventional circuit closing means for the lamp 31. If the indicator 30' stands between the marks 29" and 29'", a lamp 31' lights up, again by conventional circuit means, and if the pointer 30' passes towards the right over the mark 29'", then the lamp 31" will light up. The marks 29" and 29'" are adjustable. In a similar manner, the lamps 31'", 31"" and 31""' will light up, dependent upon the position of the pointer 30 in the indicator instrument 28.

If the diameters of the work piece 9, which are measured by the measuring value indicators 14' and 14" change, by example, for 0.004 mm., so that the pointer 30' stands at the right of the mark 29'", the lamp 31" lights up. Relays 32 and 32' are disposed in parallel in corresponding circuits of the lamps 31 and 31", so that upon lighting of the lamp 31 the relay 32 and upon lighting of the lamp 31" the relay 32' is excited.

Upon exciting of the relay 32', a switch 33' is closed, which in turn puts a relay 34' into the circuit. The relay 34' operates switches 35' and 36'. The switch 35' is disposed in series in the circuit of the relay 32' and opens the circuit of the relay 32', and the switch 36' is disposed in the circuit of a coil 103' of the adjustment magnet, which switch 36' closes for a short time period circuit through the coil 103'. Upon opening the switch 33', the relay 34' is rendered inoperative, so that the coil 103' is operative again for a short time period. Upon rendering inoperative the relay 34', the switch 35' will be closed again, so that the relay 34' is rendered operative again.

Due to the repeated operation of the coil 103 of the adjustment magnet 2", a cam 1 (FIG. 2) is turned, whereby all members, disposed between the machine bed M and the head stock 6, are elastically deformed such, that forces are created between the machine bed M and the head stock 6, which deform elastically the head stock 6 and, thereby, change the position of the axis B—B of the work piece 9. The diameters of the work piece 9 measured by the measuring value indicators 14' and 14" are thereby changed such, that the pointer 30' moves to a position between the marks 29" and 29'". Then the lamp 31' lights up, instead of the lamp 31" and the coil of the relay 32' is no more excited.

If the difference between the diameters of the work piece 9 is in the direction opposite to the situation set forth above, then the relays 32, 34, are excited and switches 33, 35 and 36 are operated, in the manner described above in connection with the relays 32, 34 and the switches, respectively, 33', 35' and 36', so that the adjustment magnet 2' turns the cam 1 in opposite direction, whereby the position of the axis B—B of the work piece 9 is changed as described above, but in the opposite direction.

Referring now again to the drawings, and in particular to FIG. 5, a different embodiment is disclosed of the adjustment means for the axis B—B of the work piece 9.

Substantially, this embodiment operates in the same manner as disclosed in the embodiment of FIG. 4. The switch 33 does not excite, however, the relay 34, rather the switch 33 closes the circuit of an electric motor 37, which turns in the direction of the arrow, while upon closing the switch 33', the electric motor 37 turns in opposite direction. The cam 1 is keyed to this embodiment to the motor shaft and functions thus in the same manner as set forth above. Depending upon the position of the pointer 30', the corresponding direction of rotation of the electric motor 37 is arranged by closing the corresponding switch 33 or 33' for such time period, until the position of the work piece 9 is corrected, so that eventually the pointer 30' is disposed between the marks 29" and 29'".

The correction of the position of the work piece is performed, preferably, not yet with the larger dimensions of the work piece 9 and should also not be done shortly before reaching the final dimension of the work piece 9. The correction of the work piece 9 is performed, preferably, when the pointer 30 of the indicator instrument 28 is disposed between the marks 29 and 29'. The mark 29 should correspond to an over-measure of the work piece 9 of about 0.08 mm. to 0.1 mm. and the mark 29' should correspond to an over-measure of the work piece 9 of about 0.005 mm. to 0.01 mm.

The correction of the position of the axis B—B takes place only if the pointer 30 stands between the marks 29 and 29' and accordingly the lamp 31"" lights up and the relays 32" and 32'" are not excited and the switches 33" and 33'" are closed. The feeding of electric current is thus switched through the switches 33 and 33', respectively, so that the adjusting magnets 2' and 2" or the electric motor turn the cam 1 and correct, thereby, the position of the axis B—B of the work piece 9.

Due to the effect of the mentioned forces upon at least one of the cited structural elements, it is brought about that the spacial position of the structural part or parts is changed and, thereby, also the position of the axis B—B and/or the axis C—C, which change of position is essential for the final result of the work.

In accordance with the performance following the present invention, it is possible that the position change of the mentioned structural parts takes place by displacement of the structural parts on suitable sliding faces or bearings due to the effect of the impulse controlled forces or by elastic deformation of these structural parts, of a portion of one or a plurality of structural parts or the support and supports, respectively, of these structural parts or jointly by displacement and elastic deformation.

In order to bring about such displacement and/or of the elastic deformation, any known feeding mechanism operating with sufficient exactness is basically applicable for the performance in accordance with the present invention. It is decisive that the necessary small feeding and return movement of the mentioned structural parts can take place with sufficient exactness in steps of the order of one or a plurality of thousands of millimeters. This is achieved in the simplest manner, if a displacement is ruled out and merely an elastic deformation is provided.

In case of exploitation of the elastic deformation it is a particular characteristic of the present invention, that forces corresponding to the control impulses are exerted upon at least one of the mentioned structural parts, whereby as a function of a prevailing force a deformation and, thereby, a position change and, thus, an enforced change of the spacial position of the work piece axis and/or grinding wheel spindle axis results.

Practical experiments have surprisingly shown, that such elastic deformations of structural parts of a grinding machine upon effecting of forces take place always and are repeatable. Thus, the present invention deals with a kind of spring diagram within the range of smallest spring strokes.

Basically, as has been set forth above, for the creation of such forces which, for instance, can serve not only for the elastic deformation, but also for the displacement of the mentioned structural parts, each mechanism or each feeding mechanism is suitable, which is capable of providing forces responsive to the control impulses, which are effective by displacement or deformation upon one or a plurality of the mentioned structural parts. For the production of these forces and also for the production of strokes for displacement, for instance, a thread, a differential thread, a hydraulic piston or the like, can be provided, whereby always correspondingly coordinated structural members as magnets, ratchet wheels or the like, can be provided.

An arrangement particularly suitable for performing in accordance with the present invention is disclosed in FIG. 1. The structural part, which is subjected to the forces, is the head stock 6. The device of the present invention and particularly suitable for the method, shown in a top plan view in FIG. 1 and in an end view in FIG. 2, is supported on the machine bed M by means of the cam 1, as shown in FIG. 2, the set screw 7 and the bracket K'. The device itself is screwed onto the head stock 6. The magnets 2' and 2" push or pull, controlled by the control impulses of the difference indication, as disclosed and described in connection with FIGS. 4 and 5, the push-pawls 3' and 3" into or from the ratchet wheels 4' and 4", respectively, whereby the movement return of the push-pawls 3' and 3" is brought about by the springs 5' and 5", respectively. By this operation, the cam 1 is turned about the axis A—A, whereby, in accordance with the chosen direction of rotation and the shape of the cam, all members disposed between the machine bed M and the head stock 6 are elastically deformed in such manner, that forces are created between the machine bed M and the head stock 6, which deform elastically the head stock 6 and, thereby, change the position of the axis B—B of the workpiece 9. The set screw 7 assures a play-free adjustment of the cam 1, whereby a continuous closed system of mechanical forces is maintained even upon reversal of the direction of the forces.

Referring now to FIG. 6 of the drawings, the workpiece 9, thus the crank-shaft, is sensed continuously by the sensing pins 16 and 16' of the measuring bills 17 and 17' during the grinding operation. The measuring bills are subjected to the force of a spring 18 secured at both ends to the respective bills 17 and 17'. The measuring value indicators 14' and 14" are secured to the machine table or the like by suitable holding means 18' and an elastic mounting of the measuring bills 17 and 17' is provided by the arrangement of spring blades 19. A spring-biased sensing pin 21 is disclosed in FIG. 4, which pin 21 cooperates with the inductive coil 24, to constitute an inductive length measuring means. The latter transforms the relative movement of the two measuring bills 17 and 17' into an electric measuring value. The electric measuring value is fed to the measuring control device 15 (FIG. 1) by electric conduit means, as set forth above.

A similar measuring value indicator (not shown) can be provided for the grinding wheel spindle 10.

Referring now to FIG. 7, the operation of the cam 1 by means of electro-magnets 2' and 2" is disclosed. An iron core 101 is equipped with a push-pawl 102 which has a coil 103 wound thereover, the entire unit being disposed in a housing 100 and a pressure spring 107 surrounding an extension of the iron core 101 tends to retain the latter in its rearmost position. The coil 103 is fed through its terminals 104 and 105 by means of the conduits 106.

Referring now to FIG. 8, a pneumatically operating device for operation of the cam 1 is disclosed schematically. A pressure cylinder 100' has a piston 101' reciprocating therein, which piston 101' has at one side a push-pawl 102' extending therefrom and on its opposite side a connecting rod 102a secured to a control slide 107' having a conduit 108' for feeding pressurized air into the slide 107' and another conduit 109' for escaping air for the return movement of the piston 101'. The piston 101' performs in known manner a reciprocating movement upon feeding pressurized air to the slide 107'.

Referring now to FIG. 9, an electrically operated adjustment means is disclosed. An electric motor $103^2$ drives by its shaft a worm $101^2$ which is in mesh with a worm gear $102^2$ which turns about a threaded spindle $104^2$ which is mounted non-rotatably, but axially movable, in a housing $100^2$ engaging, for example, the head stock 6.

Referring now to FIG. 10, a hydraulically operating adjustment means is disclosed. It comprises a pressure cylinder $100^3$ in which a piston $101^3$ reciprocates. A conduit $107^4$ feeds to a control slide $107^3$ which receives pressure fluid, as oil, from a pump (not shown) and is operatively connected with the pressure side and the suction side of the pressure cylinder $100^3$. A piston rod $102^3$ engages the head stock 6 in order to exert the correction performing forces.

FIG. 11 discloses schematically a circuit diagram of the measuring control device 15 (FIG. 1). The measuring value indicators 14' and 14" feed to the measuring control device 15. The measuring value amplifiers 20 and $21^0$ are in electrically operative connection with a comparison device 22, which is shown, as set forth above, by example, as a Wheatstone-bridge. The latter is in electrical connection with the analogous-digital-transformers 43 and 44.

The feeding of the grinding wheel spindle 10 toward the work piece 9 takes place at first as a coarse feeding. The portions of the work piece 9 engaging the grinding wheels 11', 11", 11''' and 11'''' have a reduced diameter, whereby the actual values $x1$ and $x2$ received in the measuring value amplifiers 20 and $21^0$ from the measuring value indicators 14' and 14" and the conduits $a'$ and $b'$ are likewise reduced continuously. In the measuring value amplifiers 20 and $21^0$ these actual values (diameters-actual measures) are compared with the preset, predetermined values (diameter-predetermined measures) $xk1.1$ and $xk2.1$. The deviations resulting therefrom, $$xw1.1 = x1 - xk1.1$$

and $xw2.1 = x2 - xk2.1$, are fed simultaneously by the conduits $c$ and $d$ into the analogous-digital-transformer 44 and by means of the conduits $e$ and $f$ into the comparison device 22. These deviations fed into the comparison device 22 remain at first without effect, since the output of the analogous-digital-transformer 43, connected with the comparison device 22 by the conduit $g$, is blocked. The feeding speed of the grinding wheel spindle 10 towards the work piece 9 is shifted in known manner through the output conduit $k$ of the analogous-digital-transformer 44 from coarse to fine, as soon as one of the deviations $xw1.1$ and $xw2.1$ equals zero. Simultaneously the blocking of the output on the analogous-digital-transformer 43 is released by the conduit $m$.

In the fine feeding which takes place now, the actual values $x1$ and $x2$ are compared suitably in the same manner with preset, predetermined values $xk1.2$ and $xk2.2$ for the stopping of the feeding of the grinding wheels. The resulting deviations $xw1.2 = x1 - xk1.2$ and $$xw2.2 = x2 - xk2.2$$

are fed simultaneously by means of the conduits $c$ and $d$ into the analogous-digital-transformer 44 and by means of the conduits $e$ and $f$ into the Wheatstone bridge 25. By means of the comparison device 22 the deviation of second order $xw3 = xw1.2 - xw2.2$ is determined and fed by means of the conduit $g$ into the analogous-digital-transformer 43. The latter operates the starting device 45 for the adjustment magnets 2′ and 2″ by means of the conduit $h$, as long as $xw3$ does not surpass a predetermined value. This value is the constructively conditioned, no more compensable remaining deviation (limit of the compensation exactness). The direction of adjustment is determined by the plus or minus sign of $xw3$. If the deviation $xw3$ reaches its border value, the signal is omitted, which is emitted by the analogous-digital-transformer 43 by the conduit $h$ to the starting device 45 and the adjustment magnets 2′ and 2″ are rendered inoperative.

The stopping of the advancement of the grinding wheels takes place in known manner over the other branch, in which the deviations $xw1.2$ and $xw2.2$ by means of the conduits $c$ and $d$ are fed into the analogous-digital-transformer 44, as soon as one of these deviations equals zero.

FIG. 3 shows a front elevation of the board of a measuring control device, particularly suitable for the performance of the method in accordance with the present invention, which device indicates on the instruments I and III the deviation of two measured diameters from their calculated values and on the instrument II the difference of the measured deviations.

In known manner control points are set on the instrument I by means of preferably lockable fine adjustment knobs F1, F2, F3 and F4, which release signals, whereby the release of the signals is indicated always on the lamps A1, A2, A3 and A4. The instrument III delivers only a finished measurement signal.

The instrument II shows the difference of the measured deviations and, as a rule, at least two switching points $a$ and $b$ are adjustable thereon. One of the signals of the instrument I gives now during the grinding process at a predetermined point, set forth above, the impulse for the preferably automatic reading of the difference indicated on the instrument II, whereby for an automatic digital signal delivery for the purpose of performing the method of the present invention, as a rule, two signals suffice. The lockable service knobs $J_I$, $J_{II}$, and $J_{III}$, as shown in FIG. 3, serves the zero-point adjustment of the instruments I, II and III. It is feasible that the method of the present invention is applied also at other fine or finest working processes.

While I have disclosed several embodiments of the present invention, it is to be understood that these embodiments are given by example only and not in a limiting sense, the scope of the present invention being determined by the objects and the claims.

I claim:
1. In a machine for grinding a work piece,
means for rotatably supporting a work piece comprising
a base,
a head stock and a foot stock operatively mounted on said base,
means for maintaining final size of all portions of said work piece within close predetermined limits comprising
gages disposed at at least two points axially spaced apart from each other on said work piece,
means for deforming at least one of said means rotatably supporting said work piece, comprising
a reversible adjusting mechanism,
gage actuated control means for actuating said adjusting mechanism during the grinding operation,
said gages being operatively connected to and controlling said gage actuated control means,
said gage actuated control means being responsive to variations in size of said work piece and to the angular relation between the grinding wheel axis and the work piece axis between said engaging points of said gages on said work piece, respectively, during the grinding operation to actuate said adjusting means in order to correct said size variations to a predetermined size,
whereby any change in the predetermined angular relation between the grinding wheel axis and the work piece axis is corrected during the grinding operation.
2. The machine, as set forth in claim 1, wherein
said gage actuated control means include pulse emitting means, and
said adjusting mechanism receives said pulses and transforms the latter into correction movements.
3. The machine, as set forth in claim 2, which includes means for rendering operative said pulse emitting means shortly prior to reaching the calculated value of the size of said work piece at said gage engaging points.
4. The machine, as set forth in claim 1, wherein
said means for deforming at least one of said supporting means comprises a cam rotatably mounted and engaging said one of said means for rotatably supporting,
two ratchet wheels secured to said cam for joint rotation and
pulse responding means for operation of one of said ratchet wheels and rotations of said cam in predetermined direction.
5. The machine, as set forth in claim 4, which includes a spring-biased push-pawl coordinated to and engaging each of said ratchet wheels, and
said push-pawls turning stepwise the corresponding of said ratchet wheels in response to said pulses.
6. The machine, as set forth in claim 1, which includes at least two axially spaced grinding wheels grinding correspondngly spaced portions of said workpiece,
said gages being applied to said workpiece at points corresponding to said grinding wheels and actuating said adjusting mechanism in accordance with variations in progress of the grinding operation on said spaced portions of the workpiece.
7. A method of correcting for variations of size and angular relation between a workpiece to be ground and a tool, said method comprising the steps of
gaging at least two axially spaced points on said workpiece to register variations from a predetermined value in size and angular relationship, respectively, between said tool and said workpiece,
converting said registered variations to a signal, and
translating said signal into automatic correction of said variations.

References Cited by the Examiner

UNITED STATES PATENTS

| | | | |
|---|---|---|---|
| 1,225,858 | 5/1917 | Raule | 51—165.01 |
| 2,553,699 | 5/1951 | Brodin. | |
| 2,708,816 | 5/1955 | Balsiger | 51—105 |
| 2,926,467 | 3/1960 | Krause et al. | 51—165.01 |
| 3,097,454 | 7/1963 | Pheil | 51—165 |

FOREIGN PATENTS 857,971  1/1961  Great Britain.

LESTER M. SWINGLE, *Primary Examiner.*